ELECTRO-OPTICAL CONTOUR ENHANCEMENT

INVENTOR
Leslie S. G. Kovasznay
Horace M. Joseph
BY Howard L. Rose
AGENT

Sept. 8, 1959 L. S. G. KOVASZNAY ET AL 2,903,507

ELECTRO-OPTICAL CONTOUR ENHANCEMENT

Filed April 23, 1954 4 Sheets-Sheet 2

INVENTOR

Leslie S. G. Kovasznay

Horace M. Joseph

BY Howard L. Rose

AGENT

Sept. 8, 1959 L. S. G. KOVASZNAY ET AL 2,903,507
ELECTRO-OPTICAL CONTOUR ENHANCEMENT
Filed April 23. 1954 4 Sheets-Sheet 3
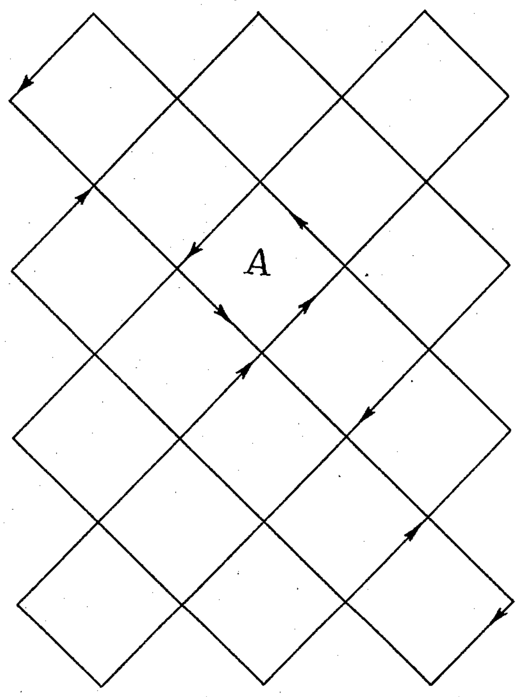
Fig. 4
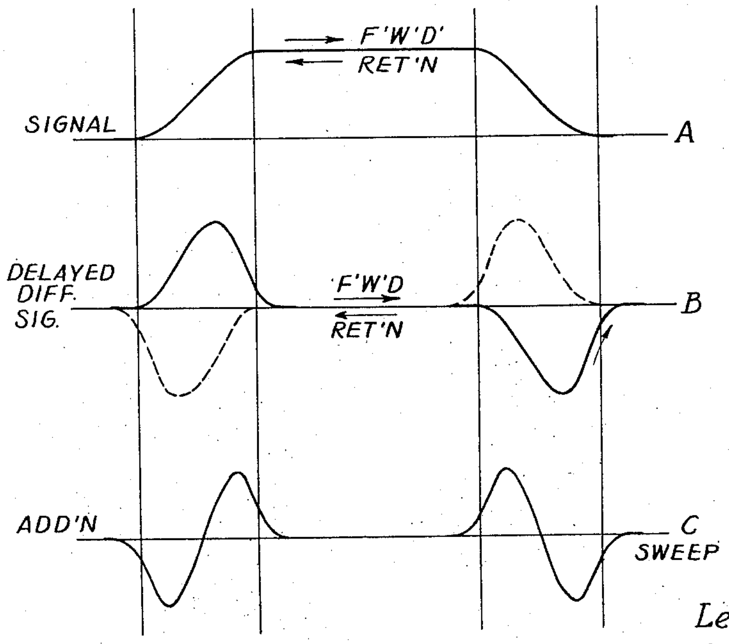
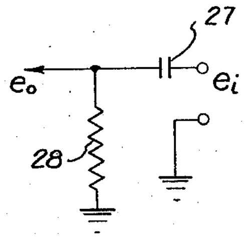
Fig. 6
Fig. 5
INVENTOR
Leslie S. G. Kovasznay
Horace M. Joseph
BY Howard L. Rose
AGENT INVENTORS
Leslie S. G. Kovasznay
Horace M. Joseph
BY Arthur Vinograd
Leonard K. Stoll
ATTORNEYS United States Patent Office 2,903,507

Patented Sept. 8, 1959

2,903,507

ELECTRO-OPTICAL CONTOUR ENHANCEMENT

Leslie S. G. Kovasznay, Baltimore, and Horace M. Joseph, Kensington, Md., assignors to the United States of America as represented by the Secretary of Commerce Application April 23, 1954, Serial No. 425,337

10 Claims. (Cl. 178—6)

The present invention relates to an electro-optical system and in particular to a system for producing an enhanced reproduction of an image. In both television and photography it is often desirable to increase the sharpness of the contrast in a picture in which the normal contrast has been somewhat decreased by blurring. It can be readily seen that means for providing increased clarity would be desirable not only from the aesthetic point of view but also for scientific purposes. In scientific work a means for sharpening an image would be useful in many fields, as for example, when examining X-ray or electron microscope pictures.

It is therefore the primary object of the present invention to provide a relatively simple electro-optical system which is capable of greatly enhancing the detail of an image to be examined.

It is another object of the present invention to provide a system for enhancing images which is equally applicable to photography and television.

Another object of the present invention is to provide an electro-optical system for image enhancement in which the unavoidable time delays are utilized in the production of the necessary signals.

In accordance with the present invention there is provided a means for scanning as image whose representation is to be enhanced and for producing electrical signals which are representative of the image. The second derivatives of these signals which provide for the enhancement of the image are added to the signals themselves and displayed on a cathode ray tube. In the preferred embodiment of the invention electronic circuits are provided for obtaining the first derivatives of the picture signals while the second derivatives are produced either by retention on the face of a cathode ray tube or on a photographic plate. The sweep of the means for scanning the image and the sweep of the cathode ray tube are identical and synchronized. The electrical signal representations of the image are also fed back to the light source in the scanning mechanism to provide negative feedback for stabilization of the light source.

Other uses and advantages of the invention will become apparent upon reference to the specification and drawings.

Figure 4 is a graph of a sweep pattern which may be used with the present invention.

Figure 5 is a graph of various wave forms obtained with the preferred embodiment of the invention.

Figure 6 is a circuit diagram of a differentiating circuit.

Figure 1:
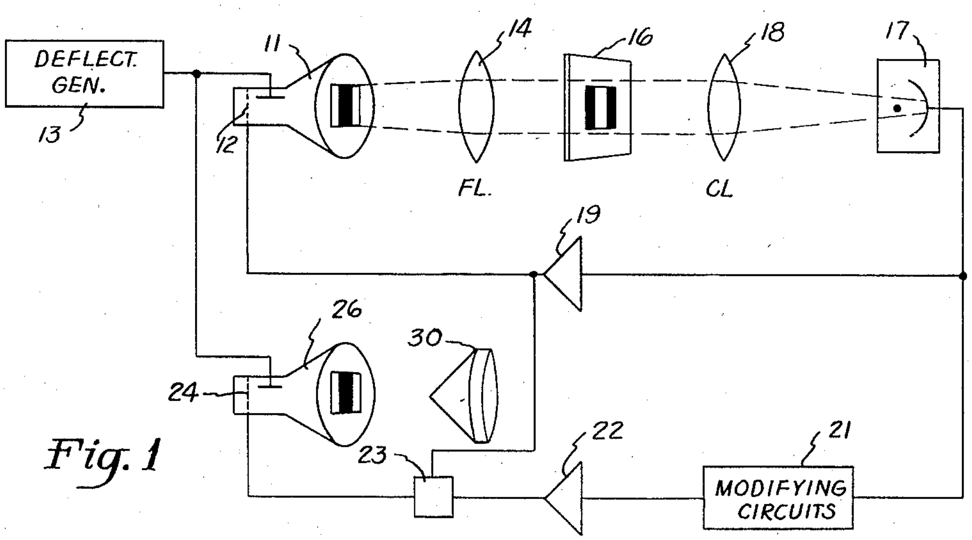
Figure 1 is a schematic diagram of the system of the present invention.

Referring to Figure 1 there is shown an embodiment of the present invention in which a cathode ray tube 11 having a control grid 12 is used to produce a flying spot of light for examining the image which is to be enhanced. The deflection circuits of the tube 11 are connected to the deflection generator 13. The scan produced by this generator will be discussed in detail later in the specification. The spot of light produced on the phosphor surface of the tube 11 is focused by the focusing lens 14 on the transparency 16 which carries the image to be enhanced. The light passing through the transparency 16 is focused on the photocell 17 by the condensing lens 18. The output of the photocell is fed through the amplifier 19 to the control grid 12 of the cathode ray tube 11. The output of the photocell 17 is also connected to the input of the modifying circuits 21, which will be discussed in greater detail in connection with Figure 6. The output of the modifying circuits 21 are amplified in the amplifier 22 and added in the adder 23 to the output of the amplifier 19 to provide a composite signal. The output of the adder 23 is connected to the control grid 24 of the monitor cathode ray tube 26. The deflection circuits of the cathode ray tube 26 are also connected to the output of the deflection generator 13. A camera 30 is positioned so that the face of the cathode ray tube 26 may be photographed.

Figure 2:
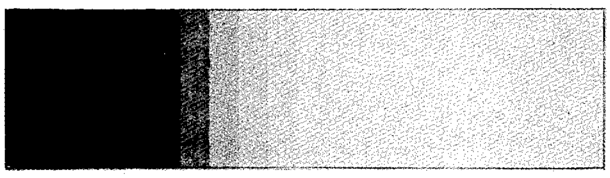
Figure 2 is a step wedge.

Before discussing the operation of the circuit of Figure 1 it may be well to first refer to Figure 2 which shows a group of vertical strips of varying grayness, commonly called a step wedge. Each of these vertical strips is of uniform grayness across its horizontal dimension. This may be seen by looking at each vertical strip after concealing the adjacent strips. However, it will be noted that when looking at the entire pattern it appears that each strip increases in grayness from left to right. This is a normal visual illusion produced by the eye, which lightens the lighter area near its boundary with the darker area and darkens the darker area near its boundary with the lighter area and has the effect of more clearly defining the limits of each strip. Thus, taking any two adjacent strips of Figure 2, since the right hand edge of the left strip appears to be darkened and the left hand edge of the right strip appears to be lightened, it is apparent that the boundary between adjacent strips will be more obvious to the eye. The present invention provides a method and apparatus for producing a smilar effect in an image.

Figure 3:
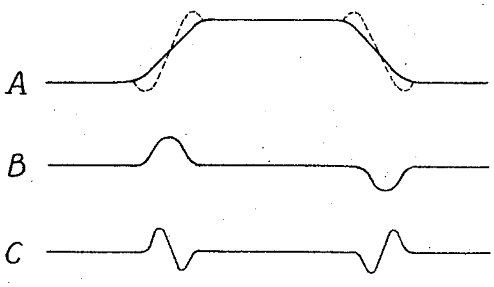
Figure 3 is a graph of various wave forms which may be produced by the circuit of Figure 1.

Referring to Figure 3 there will be seen a series of three curves. Curve A is a wave form which represents the output of the photocell 17 when the image being examined is that shown on the transparency 16 of Figure 1. In scanning from left to right, the amount of light reaching the photocell 17 increases as the flying spot passes from the dark portion to the light portion, and then decreases to the original intensity as the beam passes from the light portion in the center to the dark portion at the right side of the transparency. If the first derivative of this signal is taken, then the wave form B will be produced. If the derivative of wave form B is taken, to produce the second derivative of wave form A, the wave form C will be produced. If this signal C is inverted and added to (subtracted from) wave form A, the transition of the picture from the light to the dark areas will follow the dotted lines of this curve rather than the solid line shown. It will be noted then that the portion of the dark area bordering the light area has been darkened with respect to the remainder of the darkened portion and the lighter area adjacent to the dark area has been lightened in the transition region. Therefore exactly the same effect as was noted in Figure 2 has been achieved.

Figure 8:
Figure 8 is a reproduction of a radiograph used as the transparency in the system of Figure 1.

Referring to Figure 1, if the output of the photocell 17 is doubly differentiated in the modifying circuits 21 and amplified and inverted in the amplifier 22 and added to the output of the phototube 17 in the adder 23, then the signal shown in dotted lines in Figure 3A will be achieved. This signal when applied to the grid 24 of the monitor scope 26 will produce an enhanced picture of the image 16. The particular camera technique employed in Figure 1 is only exemplary, it being possible to use an opaque image at 16 and observe the light reflected from the image at the photocell 17. Also it is possible to employ an image orthiconoscope or other television type camera to produce the signals which are to be operated upon. The amount of detail which is enhanced by the differentiating circuit of Figure 6 depends upon the time constant of the circuit. When the transparency of Figure 1 is to be operated upon it is apparent that the circuits need respond to only a single rate of change in the signal. However, when operating upon a more complex image, such as shown in Figure 8, a wide range of rates of change must be handled. In such a case a single differentiating circuit may not be able to differentiate all of the various rates, and it may be necessary to use several differentiating networks having different time constants. The inputs of these networks would be connected in parallel and the outputs would be added. In this way it is possible for the system to enhance the slow changes in the optical characteristics of the image as well as the rapid changes.

It will be noted that the output of the photocell 17 is fed back to the control grid of the scanning tube 12. This provides negative feedback in the system, and if the feedback is strong the system tends to minimize the output of the phototube and therefore tends to produce a constant light intensity reaching the phototube from each point on the transparency. The picture reproduced on the cathode ray tube 11 is a negative of the transparency and because of the improvement added by negative feedback, the contrast range is the same as that of the original. The finite response times of the various elements in the feedback loop are reduced by this negative feedback, especially the delay time of the phosphor and of the feedback amplifier.

The sweep pattern necessary for use in the invention as shown in Figure 1 is not an ordinary television sweep. In the ordinary television type of scanning, scanning occurs only in one direction, normally the horizontal direction. Therefore if this scan were used, differentiation of the output of the photocell would produce enhancement only in the vertical direction and not in the horizontal direction. This could conceivably be overcome by the use of the complex memory circuits with instantaneous accessibility which would remember the point-by-point intensity along the horizontal sweep. These intensities would be compared with the point-by-point intensity during the next horizontal sweep to produce a differential signal dependent upon the varying intensities. However, it is quite obvious that such a procedure would be both difficult and complex. This difficulty can be overcome by interchanging the horizontal and vertical sweeps at the end of each sweep pattern. This then would provide for scanning of the image 16 in both the horizontal and vertical plane, and such a procedure is acceptable, although not entirely satisfactory. With such a procedure difficulty is experienced because of attenuation of the desired signal. Regardless of the circuit elements used to obtain the second derivatives some attenuation will occur. In order to obtain good differentiating acton, the time constant of the differentiating circuit must be small compared to the rate of change of the signal. Such a circuit will therefore attenuate the desired signal but will not attenuate the high frequency noise. Another difficulty with producing the second derivatives by circuitry is that the time delays introduced by the differentiating networks may become objectionably large. If the time delay are large compared to the characteristics of the second derivative, the enhancement signal, as shown in Figure 3A, would not be ideally located as shown in that figure. This difficulty may be overcome by inserting corresponding time delays between the deflection generator and the deflection circuits for the tube 26 and between the output of the amplifier 19 and the input to the adder 23. By the addition of these delay circuits, the sweep and video signals could be adjusted to have proper time registry with the output of the modifying circuit 21. However, such a procedure makes it necessary to equalize the three delays, a situation which is somewhat difficult to attain in practice, and also attenuates the sweep and video signals.

In the case where the time delay introduced by double differentiation with circuitry is not large compared with the characteristic of the second differential signal, the time delays will cancel out in a manner to be described later.

This difficulty has been overcome in the present invention by employing the sweep pattern shown in Figure 4 and using spatial differentiation for achieving the second derivative. The sweep pattern shown in Figure 4 is described in detail and claimed in copending application, Serial No. 362,172, filed by Leslie S. G. Kovasznay on June 16, 1953, now U.S. Patent No. 2,817,787, issued December 24, 1957. In this type of sweep, as indicated by the arrows around the incremental area A, each incremental area on the face of the tube is swept in four different directions during each frame. The sweep along opposite sides of each area are parallel and in opposite directions, and it is this feature of the sweep pattern shown in Figure 4 that is particularly useful in the system of the present invention. It should be also noted at this point that the sweep lines along adjacent sides of the area are perpendicular, which insures that the sweep rate will be equal in all directions. This feature is described in detail in the aforementioned copending application, but should be noted at this point, since the output of the differentiating circuit is dependent upon the velocity of the scan. If the velocity of the scan were to vary along any of these directions, distortion would be introduced into the picture. However, it should be noted that in certain computer type applications it would be desirable to obtain cross products of partial derivatives, in which case this can be achieved by varying the sweep rates in different directions but maintaining the rate constant along each direction.

Figure 10:
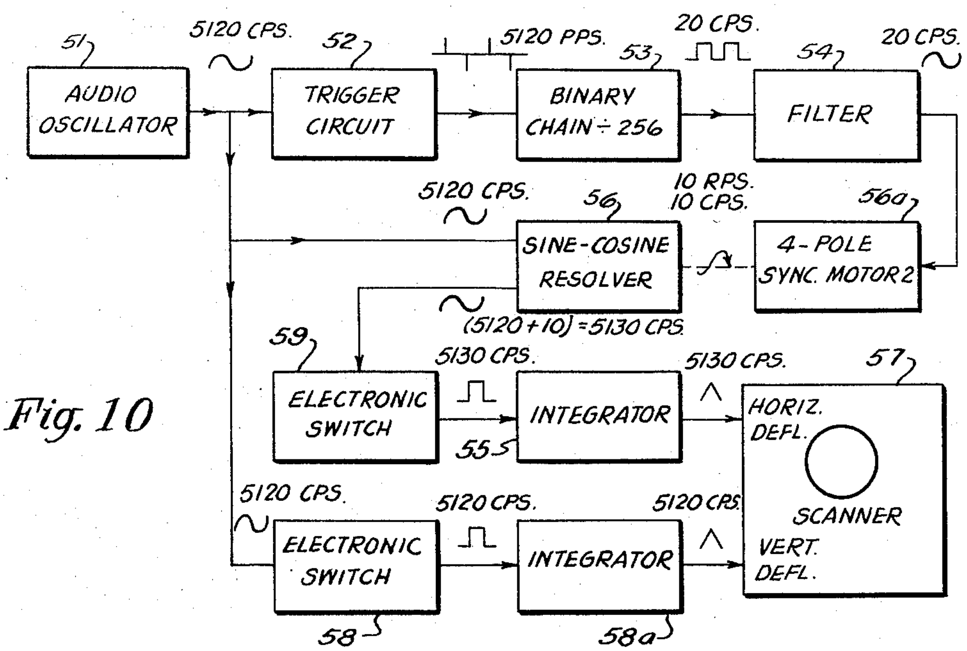
Figure 10 is a schematic diagram showing a mechanism for implementing the sweep-trace illustrated in Fig. 4.
Figure 11:
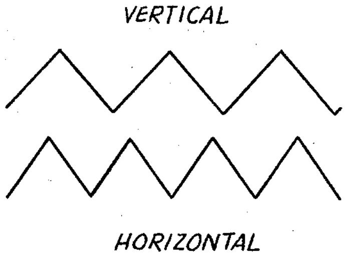
Figure 11 illustrates the deflection sweep signals generated by the mechanism of Figure 10.

A suitable circuit for producing the sweep-trace illustrated in Fig. 4 is shown in Fig. 10. Figure 11 shows the sweep signals generated by the circuit of Fig. 10. Such circuit forms the subject matter of the above-identified copending application and a detailed description of the construction and operation thereof is contained in such application.

Briefly, a master audio oscillator 51 is employed for generating a sine wave having a frequency $f_1$. For purposes of illustration such frequency may be 5120 c.p.s., this value being chosen merely for purposes of illustration. The output of audio oscillator 51 is applied concurrently to a trigger circuit 52, a sine cosine resolver 56 and an electronic switch 58 as clearly indicated in Fig. 10. Trigger circuit 52 produces a pulse output having a repetition frequency of 5120 c.p.s., the waveform of the output signal being indicated along side the trigger circuit in Fig. 10. Such signal is applied to a binary chain 53 which functions to divide the input signal by a factor of 256, the output corresponding to a 20-c.p.s. square wave as indicated in Fig. 10. Such 20-c.p.s. signal is applied to filter 54 which converts the square wave into a sine wave having a 20-cycle filter 54 is in turn connected to a four-pole synchronous motor 56*a*, which divides the frequency by 2, the rotation rate of the motor shaft therefore being 10 c.p.s. The shaft of the four-pole synchronous motor is connected to the sine cosine resolver 56 which is also electrically connected to the output of audio oscillator 51. The resulting combination of the 5120 c.p.s. signal from oscillator 51 and the 10 c.p.s. input from the shaft or motor 56*a* produces an output signal which is a sine wave having a frequency of 5130 c.p.s. Such signal is fed to the electronic switch 59 which converts the sine wave output into a square wave signal, the square waves in turn being fed to an integrator 55. Integrator 55 converts the square waves into triangular waves having a frequency of 5130 c.p.s. The triangular wave comprises a sweep signal which is fed to the horizontal deflection mechanism of the cathode-ray tube 57 indicated in Fig. 10. Such horizontal deflection signal is also indicated as the bottom wave in Fig. 11.

The application of the 5120 c.p.s. signal from audio oscillator 51 to electronic switch 58 results in a rectangular wave output having a 5120 c.p.s. repetition rate. Such signal is applied to integrator 58*a* and is converted into a triangular wave comprising a sweep signal which is applied to the vertical deflection mechanism of the cathode-ray tube 57. The vertical sweep signal is also indicated in Fig. 11. It will be apparent that the frequency $f_2$ comprising the vertical deflection signal is displaced from the $f_1$ frequency corresponding to the horizontal deflection signal by a given ratio, and the ratio of $f_1$ to $f_2$ will remain constant regardless of variations of frequency $f_1$ within reasonable limits. As fully discussed in the above-referred-to copending application, in order to produce a sweep pattern of the type indicated in Fig. 4 in the present application, the relationship between the sweep frequencies should be $f_2-f_1=f_1/M$ where M represents the number of cycles of the basic sweep frequency $f_1$ which occurs during the frame.

If a scan of the type shown in Figure 4 is employed in the present invention, then the signals of Figure 5 rather than those of Figure 3 will be produced. When the sweep is in the forward direction, which is from left to right, the solid line differential signal of Figure 5B is produced following differentiation. When the sweep is in the return direction, from right to left, following differentiation, the dotted line signal of Figure 5B is produced. When these two signals are added, the pattern of Figure 5C results, which, it will be noted, is substantially the same as Figure 3C reversed in phase. This effect can be achieved as a result of the delay introduced by employing a differentiating circuit such as that shown in Figure 6. The differentiating circuit consists of a capacitor 27 and resistor 28, the input to the circuit being applied through the capacitor 27, and the output being obtained across the resistor 28. Owing to the inherent delay in such a circuit, the signals as shown in Figure 5B are shifted with respect to the signal of Figure 5A, representing the output of the photocell 17. However, the shift when sweeping in the forward direction is in effect corrected for by the shift when sweeping in the return direction, and therefore the signal of Figure 5C is properly positioned with respect to the sloping portions of the signal of Figure 5A. In this manner the unavoidable time delays introduced by the differentiating network are utilized to produce the desired second derivative signal (5C) when the two first derivative signals are combined in the adder 22. Also, because of the canceling effect of the two delays upon each other, a signal is produced which is not shifted in phase with respect to the wave form of Figure 5A.

The production of the second derivative in the manner described above, is based on a normal algebraic addition that occurs on a photographic film used to photograph the image on the face of the tube 26 of Figure 1 by means of camera 30 when there is sufficient background. The zero line of Figure 5A (B or C also) represents the background signal intensity produced by the image. If this background intensity is sufficient to produce a moderate level of light, which is the case in almost all practical situations, then both a positive and negative excursion from this level will affect the film. Therefore if both intensities of light are directed to the firm at different times, the effect will be cumulative. That is, if the solid line graph of Figure 5B produces a given effect on a photographic film, the broken line graph will add to this effect to a greater or lesser extent, but there is always an addition. Figure 5C is a graph therefore of the sum of the two signals of Figure 5B. The same result can be obtained directly on the phosphor surface of the cathode ray tube if the decay time of the phosphor is sufficiently slow and the phosphor characteristics are approximately linear over a large enough range. In this case, then, the phosphor surface would be used as a means for adding these two differentiated signals directly.

Figure 7:
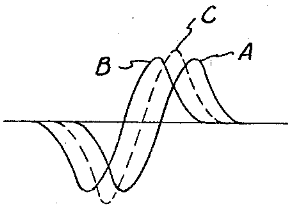
Figure 7 is a graph of various wave forms which may be produced by the system of the present invention.

As previously pointed out the second derivative may be produced by circuitry if the delay introduced by the circuitry is not too great and if the attenuation in the circuitry does not reduce the signal to an unusable level. It was also pointed out that if the delay is not too great the delays will cancel out. This can be seen by referring to Figure 7. The wave forms A and B represent the second derivatives produced on the forward and return sweeps, respectively. Because of the normal algebraic addition (described above) that occurs on the film or face of the cathode ray tube, these two signals will add to produce the dotted wave form C. As can be seen from the figure this wave form is centrally located between wave forms A and B and is therefore correctly positioned. It is apparent then that the addition which occurs on the film will not affect the enhanced image when the second derivatives are produced by circuitry if the time delays are not too large. If these delays are large, the wave form C will be distorted from the true differential form.

Figure 9:
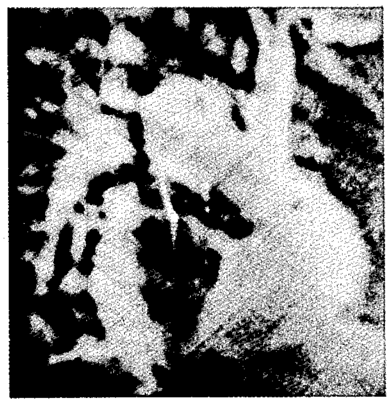
Figure 9 is a reproduction of the enhanced radiograph photographed from the face of the cathode ray tube 26 of Figure 1.

The results of the present invention are graphically shown in Figures 8 and 9. Figure 8 is a reproduction of a radiograph of a human heart, which was used as the transparency 16 in Figure 1.

Figure 9 is a photograph of the enhanced image displayed on the face of the monitor tube 26 when the transparency of Figure 8 is inserted in the system. The improvement in detail visibility is quite noticeable in this figure.

It will be apparent that the embodiments shown are only exemplary and that various modifications can be made in construction and arrangement within the scope of our invention as defined in the appended claims.

What is claimed is:

1. A system for producing an enhanced reproduction of an image, comprising means for producing electrical signals which vary with the visual characteristics of said image, said means including first means for scanning each incremental area of said image from four different directions with the sweep along each side being perpendicular to the sweeps along the adjacent sides, means responsive to the time variations of the electrical signals for modifying the electrical signals according to a predetermined function, means for combining the modified signals and the electrical signals to produce composite signals, a light source, control means for varying the intensity of said light source in accordance with the composite signals and means, including said first means, for scanning said light source.

2. The invention according to claim 1 in which said time variation responsive means produces at least the first derivatives of the electrical signals and in which means are provided for photographing said light source.

3. A system for producing an enhanced reproduction of an image comprising means for producing electrical signals which vary with the optical characteristics of said image, said means including first means for scanning square incremental areas of said image from four different directions at a constant velocity, means for producing signals which are the first derivative of the electrical signals, adding means for adding the electrical signals and the differential signals, a visual display means, means including said first means for displaying the output of said adding means on said visual display means, and means including said visual display means for spatially differentiating the differential signals to produce the second derivatives of the electrical signals.

4. A system for producing an enhanced reproduction of an image, comprising means for producing electrical signals which vary with the optical characteristics of said image, said means including first means for scanning square incremental areas of said image from four different directions at a constant velocity, means for producing signals which are at least the first derivatives of the electrical signals, adding means for adding the electrical signals and the output of said last-mentioned means to form composite signals, means for producing a signal beam, means for varying the intensity of said signal beam in accordance with said composite signals, a visual display means, and means including said first means for causing said beam to sweep said visual display means, said visual display means comprising a cathode-ray tube having a phosphor surface the linear characteristics and retentive property of which is capable of producing the second first derivatives of the electrical signals from the visual representations of the first derivatives of the electrical signals.

5. A system for producing an enhanced reproduction of an image comprising means for producing electrical signals which vary with the optical characteristics of said image, said means including first means for scanning square incremental areas of said image from four different directions at a constant velocity, means for producing signals which are at least the first derivatives of the electrical signals, adding means for adding the electrical signals and the output of said last-mentioned means to form composite signals, means for producing a signal beam, means for varying the intensity of said signal beam in accordance with said composite signals, a visual display means, and means including said first means for causing said beam to sweep said visual display means, and means, including the retentive property of said visual display means, capable of producing the second derivatives of the electrical signals from the visual representations of the first derivatives of the electrical signals.

6. A system for producing an enhanced reproduction of an image, comprising means for producing electrical signals which vary with the optical characteristics of said image, said means including first means for scanning square incremental areas of said image from four different directions at a constant velocity, means for producing signals which are at least the first derivatives of the electrical signals, adding means for adding the electrical signals and the output of said last-mentioned means to form composite signals, means for producing a signal beam, means for varying the intensity of said signal beam in accordance with said composite signals, a visual disply means, and means including said first means for causing said beam to sweep said visual display means, and means capable of spatially differentiating a first derivative component of the signal beam variations to produce second derivatives of the electrical signals, said last-mentioned means including the retentive properties of the visual display means.

7. The invention according to claim 6 in which said adding means produces the second derivatives of the electrical signals.

8. The invention according to claim 6 in which said first derivative producing means includes a first circuit and a second circuit, each for producing first derivatives of the electrical signals, and means for adding the outputs of said circuits.

9. A system for producing an enhanced reproduction of an image comprising means for producing electrical signals which vary with the optical characteristics of said image, said means including first means for scanning each incremental area of said image from four different directions at a constant velocity so as to define a series of square incremental areas, means for producing signals which are the first derivatives of the electrical signals, adding means for adding the respective outputs of said electrical signal and said first derivative signal producing means, a cathode ray tube, means for varying the intensity of the electron beam of said cathode ray tube in accordance with the output of said adding means, and means including said first means for deflecting the electron beam.

10. A system for producing an enhanced reproduction of an image, comprising means for producing electrical signals which vary with the optical characteristics of said image, said means including first means for scanning each incremental area of said image from four different directions at a constant velocity so as to define a series of square incremental areas, means for producing signals which are the first derivatives of the electrical signals, adding means for adding the respective outputs of said electrical signal and said first derivative signal producing means, a cathode ray tube, means for varying the intensity of the electron beam of said cathode ray tube in accordance with the output of said adding means, means including said first means for deflecting the electron beam, and means for photographing the face of said cathode ray tube.

References Cited in the file of this patent

UNITED STATES PATENTS

| | | |
|---|---|---|
| 1,839,706 | Silberstein | Jan. 5, 1932 |
| 2,227,630 | Carnahan | Jan. 7, 1941 |
| 2,480,423 | Simmon | Aug. 30, 1949 |
| 2,480,424 | Simmon | Aug. 30, 1949 |
| 2,678,389 | Loughlin | May 11, 1954 |
| 2,678,964 | Loughlin | May 18, 1954 |
| 2,709,716 | Haller | May 31, 1955 |
| 2,759,044 | Oliver | Aug. 14, 1956 |